(12) United States Patent
Zhang et al.

(10) Patent No.: US 12,430,490 B2
(45) Date of Patent: *Sep. 30, 2025

(54) METHOD FOR GENERATING PATTERNING DEVICE PATTERN AT PATCH BOUNDARY

(71) Applicant: ASML NETHERLANDS B.V., Veldhoven (NL)

(72) Inventors: Quan Zhang, San Jose, CA (US);
Yong-Ju Cho, San Jose, CA (US);
Zhangnan Zhu, San Jose, CA (US);
Boyang Huang, Shenzhen (CN);
Been-Der Chen, Milpitas, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,822

(22) Filed: Oct. 23, 2023

(65) Prior Publication Data
US 2024/0095437 A1    Mar. 21, 2024

Related U.S. Application Data

(63) Continuation of application No. 17/418,102, filed as application No. PCT/EP2019/081574 on Nov. 18, 2019, now Pat. No. 11,797,748.
(Continued)

(51) Int. Cl.
*G06F 30/30*    (2020.01)
*G03F 1/36*    (2012.01)
(Continued)

(52) U.S. Cl.
CPC .............. *G06F 30/398* (2020.01); *G03F 1/36* (2013.01); *G03F 1/70* (2013.01); *G03F 7/70441* (2013.01); *G03F 1/44* (2013.01); *G06F 2119/18* (2020.01)

(58) Field of Classification Search
None
See application file for complete search history.

(56) References Cited

U.S. PATENT DOCUMENTS

| 5,229,872 A | 7/1993 | Mumola |
| 6,046,792 A | 4/2000 | Van Der Werf et al. |
| (Continued) | | |

FOREIGN PATENT DOCUMENTS

| CN | 1620632 | 5/2005 |
| CN | 101276141 | 10/2008 |
| (Continued) | | |

OTHER PUBLICATIONS

Office Action issued in corresponding Chinese Patent Application No. 201980086926, dated Jan. 6, 2024.
(Continued)

*Primary Examiner* — Leigh M Garbowski
(74) *Attorney, Agent, or Firm* — Pillsbury Winthrop Shaw Pittman LLP

(57) ABSTRACT

A method for generating a mask pattern to be employed in a patterning process. The method including obtaining (i) a first feature patch including a first polygon portion of an initial mask pattern, and (ii) a second feature patch including a second polygon portion of the initial mask pattern; adjusting the second polygon portion at a patch boundary between the first feature patch and the second feature patch such that a difference between the first polygon portion and the second polygon portion at the patch boundary is reduced; and combining the first polygon portion and the adjusted second polygon portion at the patch boundary to form the mask pattern.

12 Claims, 13 Drawing Sheets

Related U.S. Application Data

(60) Provisional application No. 62/785,981, filed on Dec. 28, 2018.

(51) Int. Cl.
    *G03F 1/70* (2012.01)
    *G03F 7/00* (2006.01)
    *G06F 30/398* (2020.01)
    *G03F 1/44* (2012.01)
    *G06F 119/18* (2020.01)

(56) References Cited

U.S. PATENT DOCUMENTS

| | | | |
|---|---|---|---|
| 6,721,938 B2 * | 4/2004 | Pierrat | G03F 1/30 |
| | | | 430/394 |
| 7,434,199 B2 | 10/2008 | Cobb et al. | |
| 7,587,704 B2 | 9/2009 | Ye et al. | |
| 7,703,069 B1 | 4/2010 | Liu et al. | |
| 8,111,921 B2 | 2/2012 | Hsu et al. | |
| 8,200,468 B2 | 6/2012 | Ye et al. | |
| 8,572,521 B2 | 10/2013 | Chen et al. | |
| 8,584,056 B2 | 11/2013 | Chen et al. | |
| 8,713,488 B2 | 4/2014 | Sakajiri | |
| 9,047,658 B2 | 6/2015 | Hsieh et al. | |
| 9,111,062 B2 | 8/2015 | Chen et al. | |
| 9,355,204 B2 | 5/2016 | Seo et al. | |
| 9,588,438 B2 | 3/2017 | Hsu et al. | |
| 9,996,658 B2 | 6/2018 | Kim et al. | |
| 10,409,153 B2 * | 9/2019 | Jin | G06F 30/3323 |
| 10,437,158 B2 | 10/2019 | Socha | |
| 11,415,896 B2 | 8/2022 | Kim | |
| 11,797,748 B2 * | 10/2023 | Zhang | G03F 1/70 |
| 2007/0031745 A1 | 2/2007 | Ye et al. | |
| 2007/0050749 A1 | 3/2007 | Ye et al. | |
| 2008/0301620 A1 | 12/2008 | Ye et al. | |
| 2008/0309897 A1 | 12/2008 | Wong et al. | |
| 2009/0125866 A1 | 5/2009 | Wang et al. | |
| 2009/0157360 A1 | 6/2009 | Ye et al. | |
| 2009/0217224 A1 | 8/2009 | Wiaux et al. | |
| 2010/0162197 A1 | 6/2010 | Ye et al. | |
| 2010/0180251 A1 | 7/2010 | Ye et al. | |
| 2011/0099526 A1 | 4/2011 | Liu | |
| 2013/0000505 A1 | 1/2013 | Tao et al. | |
| 2013/0042210 A1 | 2/2013 | Lu et al. | |
| 2013/0198700 A1 | 8/2013 | Sakajiri | |
| 2015/0089459 A1 | 3/2015 | Liu | |
| 2015/0125063 A1 | 5/2015 | Hsieh et al. | |
| 2015/0227666 A1 | 8/2015 | Seo et al. | |
| 2016/0154922 A1 | 6/2016 | Kuncha et al. | |
| 2016/0246168 A1 | 8/2016 | Ye et al. | |
| 2017/0329888 A1 | 11/2017 | Kim et al. | |

FOREIGN PATENT DOCUMENTS

| | | |
|---|---|---|
| CN | 101470344 | 7/2009 |
| CN | 103606193 | 2/2014 |
| CN | 107133944 | 9/2017 |
| JP | 2009510517 | 3/2009 |
| KR | 10-2015-0093472 | 8/2015 |
| TW | I518463 | 11/2009 |
| TW | I474104 | 2/2015 |
| TW | I620997 | 4/2018 |
| WO | 2018099716 | 6/2018 |
| WO | 2019179747 | 9/2019 |

OTHER PUBLICATIONS

International Search Report and Written Opinion issued in corresponding PCT Patent Application No. PCT/EP2019/081574, dated Apr. 2, 2020.

Taiwanese Office Action issued in corresponding Taiwanese Patent Application No. 108145028, dated Nov. 23, 2020.

Shen, Y. et al.: "Level-set-based inverse lithography for photomask synthesis", Optics Express, vol. 17, No. 26, pp. 23690-23701 (2009).

Spence, C. et al.: "Manufacturing challenges for curvilinear masks," Proc. of SPIE, vol. 10451 (Oct. 16, 2017).

Spence, C. et al.:"Full-Chip Lithography Simulation and Design Analysis—How OPC Is Changing IC Design", Proc. of SPIE, vol. 5751, pp. 1-14 (2005).

Zhang, H. et al.: "SOFT: Smooth OPC Fixing Technique for ECO Process", Proc. of SPIE, vol. 6521 (2007).

Feng et al.: "Freeform mask optimization using advanced image based M3D inverse lithography and 3D-NAND full chip OPC application," Proc. of SPIE, vol. 10587 (Mar. 20, 2018).

Office Action issued in corresponding Taiwanese Patent Application No. 110143350, dated Jan. 10, 2023.

C. Babcock et al., "Robust and automated solution for correcting hotspots locally using cost-function based OPC solver," Proc. of SPIE, vol. 9053 (2014).

X. Yan et al., "Advances in OPC Technology and Development of ZOPC Tool," Proc. of SPIE, vol. 6827 (2007).

Office Action issued in corresponding Korean Patent Application No. 10-2024-7011520 dated Sep. 10, 2024.

* cited by examiner

METHOD FOR GENERATING PATTERNING DEVICE PATTERN AT PATCH BOUNDARY

This application is a continuation of U.S. patent application Ser. No. 17/418,102, filed Jun. 24, 2021, which the U.S. national phase entry of PCT Patent Application No. PCT/EP2019/081574 which was filed on Nov. 18, 2019, which claims the benefit of priority of U.S. Patent Application No. 62/785,981 which was filed on Dec. 28, 2018 each of the foregoing application is incorporated herein in its entirety by reference.

TECHNICAL FIELD

The description herein relates generally to apparatus and methods of a patterning process and determining patterns of patterning device corresponding to a design layout.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula CD=$k_1 \times \lambda$/NA, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

In an embodiment, there is provided a method for determining a mask pattern to be employed in a patterning process. The method involves obtaining (i) a first feature patch comprising a first polygon portion of an initial mask pattern, and (ii) a second feature patch comprising a second polygon portion of the initial mask pattern; adjusting the second polygon portion at a patch boundary between the first feature patch and the second feature patch such that a difference between the first polygon portion and the second polygon portion at the patch boundary is reduced; and combining the first polygon portion and the adjusted second polygon portion at the patch boundary to form the mask pattern.

In an embodiment, the initial mask pattern is a design layout comprising a plurality of features to be imaged on a substrate subjected to the patterning process.

In an embodiment, the first polygon portion and the second polygon portion are an aspect corresponding to the feature of the initial mask pattern.

In an embodiment, the aspect is an assist feature corresponding to the target feature, the assist feature obtained via an optical proximity correction, source optimization, and/or source-mask optimization.

In an embodiment, the method further involves adjusting the first polygon portion at the patch boundary between the first feature patch and the second feature patch such that the difference between the first polygon portion and the second polygon portion at the patch boundary is reduced; and determining the mask pattern to include a combination of the adjusted first polygon portion and the second polygon portion at the patch boundary.

In an embodiment, the adjusting of the first polygon portion and/or the second polygon portion involves determining a stitching function configured to seamless join, at the patch boundary, the first polygon portion and the second polygon portion, wherein the stitching function is a mathematical shaping function that reduces the difference between the first polygon portion and the second polygon portion at the patch boundary In an embodiment, the difference between the first polygon portion and the second polygon portion is a step or a jump.

In an embodiment, the stitching function moves the polygon portions of the polygon at the patch boundary to convert the step into a ramp, or a curve.

In an embodiment, the stitching function is further configured to include a condition to satisfy a manufacturability check specification related to manufacturability of the mask pattern.

In an embodiment, the initial mask pattern comprises a plurality of patches arranged in a sequence, each patch having a priority value within the sequence.

In an embodiment, the determining the mask pattern further comprises an iterative process, an iteration involves selecting a patch having a relatively lower priority value within the sequence of the plurality of the patches; adjusting a polygon portion within the selected patch and/or another polygon portion within an adjacent patch of the selected patch such that the difference between the polygon portions is reduced; and generating the mask pattern by combining one or more patches having the same priorities with corresponding adjacent one or more patches of the plurality of patches.

In an embodiment, the difference is minimized.

In an embodiment, the first feature patch and the second feature patch are adjacent to each other.

In an embodiment, the initial mask pattern and/or the mask pattern is a curvilinear mask pattern.

Furthermore, in an embodiment, there is provided a method of reconstructing a level-set function of a curvilinear mask pattern, the method involves obtaining (i) the curvilinear mask pattern and a corresponding threshold value, (ii) an initial image rendered from the curvilinear mask pattern; and generating, via a processor, the level-set function of the curvilinear mask pattern by iteratively modifying the initial image such that a difference between an interpolated value of the curvilinear mask pattern and the threshold value is reduced.

In an embodiment, the mask image is a pixelated image comprising a plurality of pixels, each pixel having a pixel value representative of a feature of a mask pattern.

In an embodiment, the generating of the level-set function involves identifying a set of locations along the curvilinear mask pattern; determining output values of the level-set function based on pixel values of pixels corresponding to the set of locations within the mask image, wherein the level-set function is a mathematical function representing the curvilinear mask pattern of the mask image; determining a total difference between the output values of the level set function and the threshold value; and modifying one or more pixel values of pixels of the mask image, the total difference is reduced.

In an embodiment, the mask image is a rendered mask image of the curvilinear mask pattern.

In an embodiment, the method further involves obtaining, for a current patch, a polygon of a neighboring patch in the boundary region, wherein the current patch and the neighboring patch are portions of the curvilinear mask pattern; reconstructing the level-set function of the polygon of the neighboring patch; determining, based on the reconstructed level-set function, function values in the boundary region of the current patch; and adjusting, via an optical proximity correction process employing the function values, the curvilinear mask pattern of the entire current patch.

In an embodiment, obtaining the plurality of patches involves decomposing the curvilinear mask pattern into a plurality of patches, wherein the contour is split at a patch boundary between adjacent patches.

Furthermore, in an embodiment, there is provided a non-transitory computer program product comprising machine-readable instructions for causing a processor to cause performance of the steps of any of aforementioned methods.

DETAILED DESCRIPTION

Figure 1:
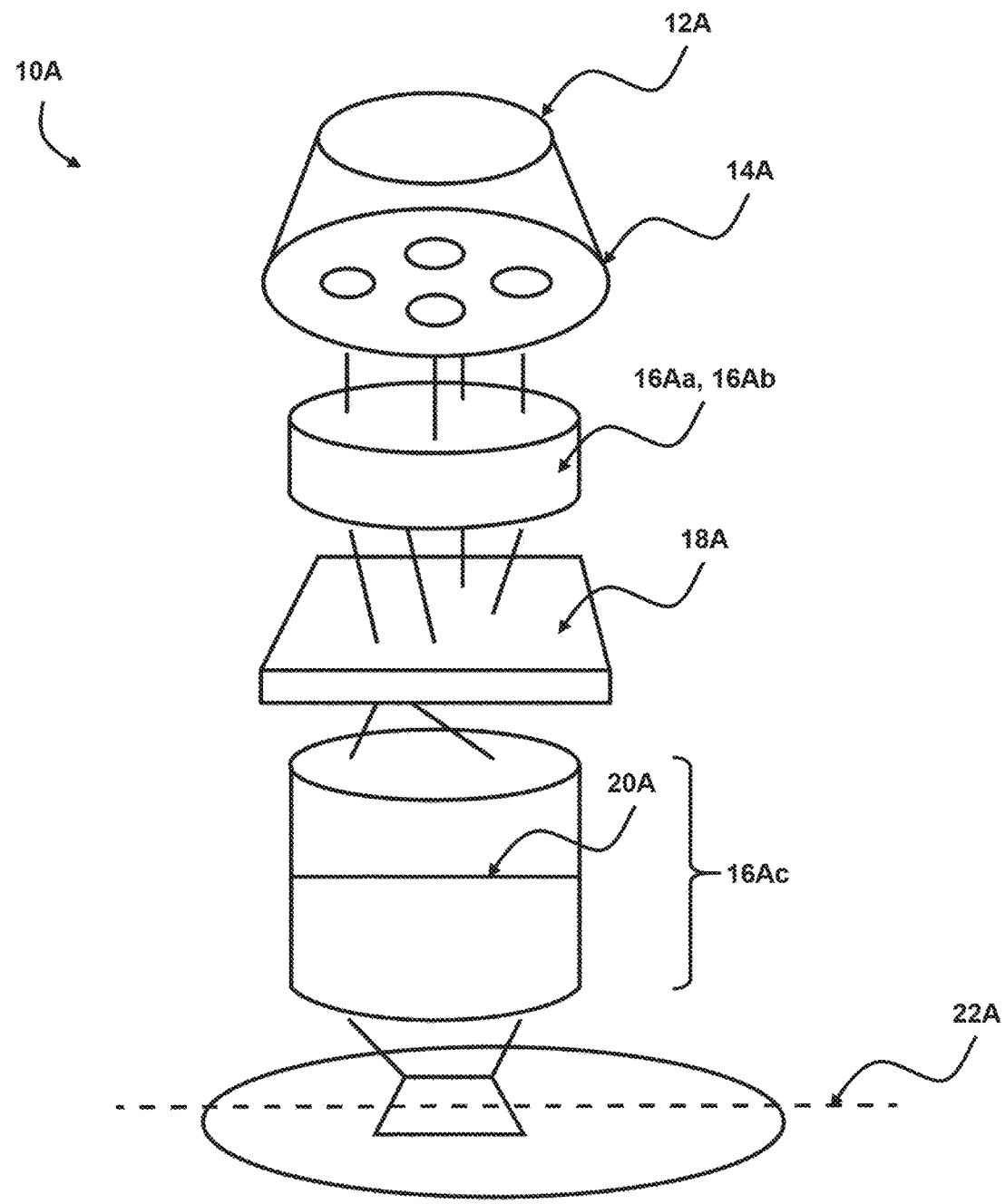
FIG. 1 shows a block diagram of various subsystems of a lithography system according to an embodiment.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The pattern layout design may include, as an example, application of resolution enhancement techniques, such as optical proximity corrections (OPC). OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, the term "mask," "patterning device" and "design layout" can be used interchangeably, as in the context of RET, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another or non-geometrical optical effects such as diffraction and interference. Similarly, proximity effects may arise from diffusion and other chemical effects during post-exposure bake (PEB), resist development, and etching that generally follow lithography.

In order to increase the chance that the projected image of the design layout is in accordance with requirements of a given target circuit design, proximity effects may be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

One of the simplest forms of OPC is selective bias. Given a CD vs. pitch curve, all of the different pitches could be forced to produce the same CD, at least at best focus and exposure, by changing the CD at the patterning device level. Thus, if a feature prints too small at the substrate level, the patterning device level feature would be biased to be slightly larger than nominal, and vice versa. Since the pattern transfer process from patterning device level to substrate level is non-linear, the amount of bias is not simply the measured CD error at best focus and exposure times the reduction ratio, but with modeling and experimentation an appropriate bias can be determined. Selective bias is an incomplete solution to the problem of proximity effects, particularly if it is only applied at the nominal process condition. Even though such bias could, in principle, be applied to give uniform CD vs. pitch curves at best focus and exposure, once the exposure process varies from the nominal condition, each biased pitch curve will respond differently, resulting in different process windows for the different features. A process window being a range of values of two or more process parameters (e.g., focus and radiation dose in the lithographic apparatus) under which a feature is sufficiently properly created (e.g., the CD of the feature is within a certain range such as ±10% or ±5%). Therefore, the "best" bias to give identical CD vs. pitch may even have a negative impact on the overall process window, reducing rather than enlarging the focus and exposure range within which all of the target features print on the substrate within the desired process tolerance.

Other more complex OPC techniques have been developed for application beyond the one-dimensional bias example above. A two-dimensional proximity effect is line end shortening. Line ends have a tendency to "pull back" from their desired end point location as a function of exposure and focus. In many cases, the degree of end shortening of a long line end can be several times larger than the corresponding line narrowing. This type of line end pull back can result in catastrophic failure of the devices being manufactured if the line end fails to completely cross over the underlying layer it was intended to cover, such as a polysilicon gate layer over a source-drain region. Since this type of pattern is highly sensitive to focus and exposure, simply biasing the line end to be longer than the design length is inadequate because the line at best focus and exposure, or in an underexposed condition, would be excessively long, resulting either in short circuits as the extended line end touches neighboring structures, or unnecessarily large circuit sizes if more space is added between individual features in the circuit. Since one of the goals of integrated circuit design and manufacturing is to maximize the number of functional elements while minimizing the area required per chip, adding excess spacing is an undesirable solution.

Two-dimensional OPC approaches may help solve the line end pull back problem. Extra structures (also known as "assist features") such as "hammerheads" or "serifs" may be added to line ends to effectively anchor them in place and provide reduced pull back over the entire process window. Even at best focus and exposure these extra structures are not resolved but they alter the appearance of the main feature without being fully resolved on their own. A "main feature" as used herein means a feature intended to print on a substrate under some or all conditions in the process window. Assist features can take on much more aggressive forms than simple hammerheads added to line ends, to the extent the pattern on the patterning device is no longer simply the desired substrate pattern upsized by the reduction ratio. Assist features such as serifs can be applied for many more situations than simply reducing line end pull back. Inner or outer serifs can be applied to any edge, especially two dimensional edges, to reduce corner rounding or edge extrusions. With enough selective biasing and assist features of all sizes and polarities, the features on the patterning device bear less and less of a resemblance to the final pattern desired at the substrate level. In general, the patterning device pattern becomes a pre-distorted version of the substrate-level pattern, where the distortion is intended to counteract or reverse the pattern deformation that will occur during the manufacturing process to produce a pattern on the substrate that is as close to the one intended by the designer as possible.

Another OPC technique involves using completely independent and non-resolvable assist features, instead of or in addition to those assist features (e.g., serifs) connected to the main features. The term "independent" here means that edges of these assist features are not connected to edges of the main features. These independent assist features are not intended or desired to print as features on the substrate, but rather are intended to modify the aerial image of a nearby main feature to enhance the printability and process tolerance of that main feature. These assist features (often referred to as "scattering bars" or "SBAR") can include sub-resolution assist features (SRAF) which are features outside edges of the main features and sub-resolution inverse features (SRIF) which are features scooped out from inside the edges of the main features. The presence of a SBAR adds yet another layer of complexity to a patterning device pattern. A simple example of a use of scattering bars is where a regular array of non-resolvable scattering bars is drawn on both sides of an isolated line feature, which has the effect of making the isolated line appear, from an aerial image standpoint, to be more representative of a single line within an array of dense lines, resulting in a process window much closer in focus and exposure tolerance to that of a dense pattern. The common process window between such a decorated isolated feature and a dense pattern will have a larger common tolerance to focus and exposure variations than that of a feature drawn as isolated at the patterning device level.

An assist feature may be viewed as a difference between features on a patterning device and features in the design layout. The terms "main feature" and "assist feature" do not imply that a particular feature on a patterning device must be labeled as one or the other.

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

- a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.
- a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin($\Theta_{max}$), wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. An example CTM flow and its details may be found in commonly assigned U.S. Pat. No. 8,584,056, the disclosure of which is incorporated herein by reference in its entirety.

According to an embodiment, the design layout may be optimized as a continuous transmission mask ("CTM optimization"). In this optimization, the transmission at all the locations of the design layout is not restricted to a number of discrete values. Instead, the transmission may assume any value within an upper bound and a lower bound. More details may be found in commonly assigned U.S. Pat. No. 8,584,056, the disclosure of which is hereby incorporated by reference in its entirety. A continuous transmission mask is very difficult, if not impossible, to implement on the patterning device. However, it is a useful tool because not restricting the transmission to a number of discrete values makes the optimization much faster. In an EUV lithographic projection apparatus, the patterning device may be reflective. The principle of CTM optimization is also applicable to a design layout to be produced on a reflective patterning device, where the reflectivity at all the locations of the design layout is not restricted to a number of discrete values. Therefore, as used herein, the term "continuous transmission mask" may refer to a design layout to be produced on a reflective patterning device or a transmissive patterning device. The CTM optimization may be based on a three-dimensional mask model that takes in account thick-mask effects. The thick-mask effects arise from the vector nature of light and may be significant when feature sizes on the design layout are smaller than the wavelength of light used in the lithographic process. The thick-mask effects include polarization dependence due to the different boundary conditions for the electric and magnetic fields, transmission, reflectance and phase error in small openings, edge diffraction (or scattering) effects or electromagnetic coupling. More details of a three-dimensional mask model may be found in commonly assigned U.S. Pat. No. 7,703,069, the disclosure of which is hereby incorporated by reference in its entirety.

In an embodiment, assist features (sub resolution assist features and/or printable resolution assist features) may be placed into the design layout based on the design layout optimized as a continuous transmission mask. This allows identification and design of the assist feature from the continuous transmission mask.

Figure 2:
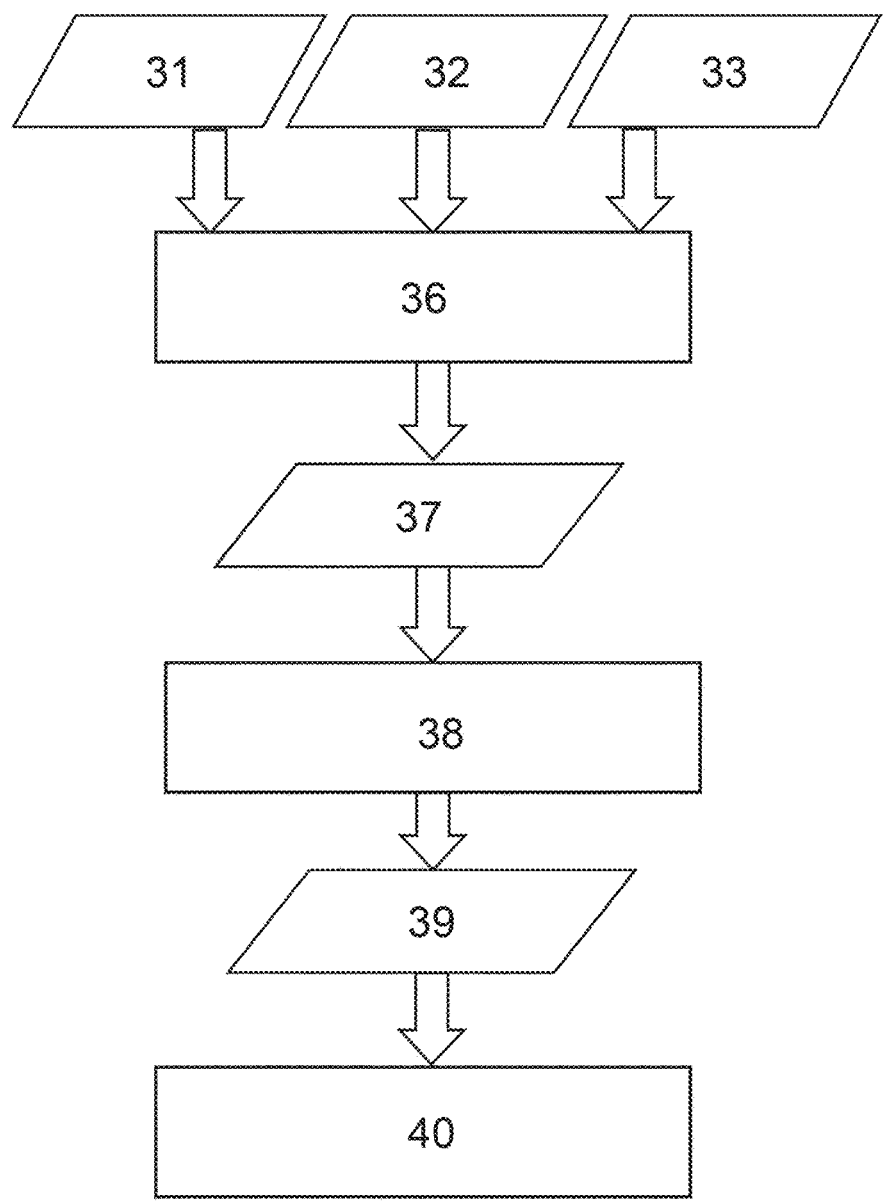
FIG. 2 illustrates a flowchart for a method of simulating at least a portion of a pattern or a characteristic of a pattern in an image according to an embodiment.

An exemplary flow chart of a method of modelling and/or simulating parts of a patterning process is illustrated in FIG. 2, for example, modelling and/or simulating at least a portion of a pattern or a characteristic of a pattern in an image (e.g., resist image, aerial image, etch image). As will be appreciated, the models may represent a different patterning process and need not comprise all the models described below.

As described above, in a lithographic projection apparatus, an illumination system provides illumination (i.e. radiation) to patterning device and projection optics directs the illumination from the patterning device onto a substrate. So, in an embodiment, the projection optics enables the formation of an aerial image (AI), which is the radiation intensity distribution at the substrate. A resist layer on the substrate is exposed and the aerial image is transferred to the resist layer as a latent "resist image" (RI) therein. The resist image (RI) can be defined as a spatial distribution of solubility of the resist in the resist layer. In an embodiment, simulation of a lithography process can simulate the production of the aerial image and/or resist image.

An illumination model 31 represents optical characteristics (including radiation intensity distribution and/or phase distribution) of an illumination mode used to generate a patterned radiation beam. The illumination model 31 can represent the optical characteristics of the illumination that include, but not limited to, numerical aperture settings, illumination sigma (σ) settings as well as any particular illumination mode shape (e.g. off-axis radiation shape such as annular, quadrupole, dipole, etc.), where σ (or sigma) is outer radial extent of the illuminator.

A projection optics model 32 represents optical characteristics (including changes to the radiation intensity distribution and/or the phase distribution caused by the projection optics) of the projection optics. The projection optics model 32 may include optical aberrations caused by various factors, for example, heating of the components of the projection optics, stress caused by mechanical connections of the components of the projection optics, etc. The projection optics model 32 can represent the optical characteristics of the projection optics, including one or more selected from: an aberration, a distortion, a refractive index, a physical size, a physical dimension, an absorption, etc. Optical properties of the lithographic projection apparatus (e.g., properties of the illumination, the patterning device pattern and the projection optics) dictate the aerial image. Since the patterning device pattern used in the lithographic projection apparatus can be changed, it is desirable to separate the optical properties of the patterning device pattern from the optical properties of the rest of the lithographic projection apparatus including at least the illumination and the projection optics. The illumination model 31 and the projection optics model 32 can be combined into a transmission cross coefficient (TCC) model.

A patterning device pattern model 33 represents optical characteristics (including changes to the radiation intensity distribution and/or the phase distribution caused by a given patterning device pattern) of a patterning device pattern (e.g., a device design layout corresponding to a feature of an integrated circuit, a memory, an electronic device, etc.), which is the representation of an arrangement of features on or formed by a patterning device. The patterning device model 33 captures how the design features are laid out in the pattern of the patterning device and may include a representation of detailed physical properties of the patterning device and a patterning device pattern, as described, for example, in U.S. Pat. No. 7,587,704, which is incorporated herein in its entirety by reference.

A resist model 37 can be used to calculate the resist image from the aerial image. An example of such a resist model can be found in U.S. Pat. No. 8,200,468, which is hereby incorporated by reference in its entirety. The resist model typically describes the effects of chemical processes which occur during resist exposure, post exposure bake (PEB) and development, in order to predict, for example, contours of resist features formed on the substrate and so it typically is related only to such properties of the resist layer (e.g., effects of chemical processes which occur during exposure, post-exposure bake and development). In an embodiment, the optical properties of the resist layer, e.g., refractive index, film thickness, propagation and polarization effects—may be captured as part of the projection optics model 32.

Having these models, an aerial image 36 can be simulated from the illumination model 31, the projection optics model 32 and the patterning device pattern model 33. An aerial image (AI) is the radiation intensity distribution at substrate level. Optical properties of the lithographic projection apparatus (e.g., properties of the illumination, the patterning device and the projection optics) dictate the aerial image.

As noted above, a resist layer on a substrate is exposed by the aerial image and the aerial image is transferred to the resist layer as a latent "resist image" (RI) therein. A resist image 38 can be simulated from the aerial image 36 using a resist model 37. So, in general, the connection between the optical and the resist model is a simulated aerial image intensity within the resist layer, which arises from the projection of radiation onto the substrate, refraction at the resist interface and multiple reflections in the resist film stack. The radiation intensity distribution (aerial image intensity) is turned into a latent "resist image" by absorption of incident energy, which is further modified by diffusion processes and various loading effects. Efficient simulation methods that are fast enough for full-chip applications approximate the realistic 3-dimensional intensity distribution in the resist stack by a 2-dimensional aerial (and resist) image.

In an embodiment, the resist image can be used as an input to a post-pattern transfer process model 39. The post-pattern transfer process model 39 defines performance of one or more post-resist development processes (e.g., etch, CMP, etc.) and can produce a post-etch image 40. That is, an etch image 40 can be simulated from the resist image 36 using a post-pattern transfer process model 39.

Thus, this model formulation describes most, if not all, of the known physics and chemistry of the overall process, and each of the model parameters desirably corresponds to a distinct physical or chemical effect. The model formulation thus sets an upper bound on how well the model can be used to simulate the overall manufacturing process.

Simulation of the patterning process can, for example, predict contours, CDs, edge placement (e.g., edge placement error), pattern shift, etc. in the aerial, resist and/or etch image. That is, the aerial image 34, the resist image 36 or the etch image 40 may be used to determine a characteristic (e.g., the existence, location, type, shape, etc. of) of a pattern. Thus, the objective of the simulation is to accurately predict, for example, edge placement, and/or contours, and/or pattern shift, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Details of techniques and models used to transform a patterning device pattern into various lithographic images (e.g., an aerial image, a resist image, etc.), apply OPC using those techniques and models and evaluate performance (e.g., in terms of process window) are described in U.S. Patent Application Publication Nos. US 2008-0301620, 2007-0050749, 2007-0031745, 2008-0309897, 2010-0162197, 2010-0180251 and 2011-0099526, the disclosure of each which is hereby incorporated by reference in its entirety.

As lithography nodes keep shrinking, more and more complicated patterning device pattern (interchangeably referred to as a mask for better readability) are required (e.g., curvilinear masks). The present method may be used in key layers with DUV scanners, EUV scanners, and/or other scanners. The method according to the present disclosure may be included in different aspect of the mask optimization process including source mask optimization (SMO), mask optimization, and/or OPC. For example, a source mask optimization process is described in U.S. Pat. No. 9,588,438 titled "Optimization Flows of Source, Mask and Projection Optics", which is hereby incorporated in its entirety by reference.

In an embodiment, a patterning device pattern is a curvilinear mask including curvilinear SRAFs having polygonal shapes, as opposed to that in Manhattan patterns having rectangular or staircase like shapes. A curvilinear mask may produce more accurate patterns on a substrate compared to a Manhattan pattern. However, the geometry of curvilinear SRAFs, their locations with respect to the target patterns, or other related parameters may create manufacturing restrictions since such curvilinear shapes may not be feasible to manufacture. Hence, such restrictions may be considered by a designer during the mask design process. A detailed discussion on the limitation and challenges in manufacturing a curvilinear mask is provided in *"Manufacturing Chal-*

*lenges for Curvilinear Masks"* by Spence, et al., Proceeding of SPIE Volume 10451, Photomask Technology, 1045104 (16 Oct. 2017); doi: 10.1117/12.2280470, which is incorporated herein by reference in its entirety.

In an embodiment, an initial mask pattern used in methods herein may be obtained via CTM process, CTM+ process employing a level set method on an initial CTM-based curvilinear mask, CTM+ process employing a sigmoid transformation an initial CTM-based curvilinear mask, etc. The present method is not limited to a particular mask pattern. The initial mask is further processed during CTM/CTM+ optimization to incorporate contour modification according to present disclosure, particularly at a patch boundary.

In an embodiment, the curvilinear mask pattern may be obtained from a continuous transmission mask (CTM+) process (an extension of CTM process) that employs a level-set method to generate curvilinear shapes of the initial mask pattern. An example of CTM process is discussed in U.S. Pat. No. 8,584,056, mentioned earlier. In an embodiment, the CTM+ process involves steps for determining, one or more characteristics of assist features of an initial mask pattern (or a mask pattern in general) using any suitable method, based on a portion or one or more characteristics thereof. For example, the one or more characteristics of assist features may be determined using a method described in U.S. Pat. No. 9,111,062, or described Y. Shen, et al., Level-Set-Based Inverse Lithography For Photomask Synthesis, Optics Express, Vol. 17, pp. 23690-23701 (2009), the disclosures of which are hereby incorporated by reference in their entirety. For example, the one or more characteristics may include one or more geometrical characteristics (e.g., absolute location, relative location, or shape) of the assist features, one or more statistical characteristics of the assist features, or parameterization of the assist features. Examples of a statistical characteristic of the assist features may include an average or variance of a geometric dimension of the assist features.

In an example, a CTM image generated by the CTM process may be used to initialize the mask variables that can be used as the initial mask pattern (an initial image), which is iteratively modified as discussed below with respect to methods 400 and 700 in FIGS. 4 and 7 discussed later. In a CTM generation technique, an inverse lithography problem is formulated as an optimization problem. The variables are related to values of pixels in a mask image, and lithography metric such as EPE or sidelobe printings are used as cost function. In an iteration of the optimization, the mask image is constructed from a mask image based on modifying values of mask variables and then a process model (e.g., Tachyon model) is applied to obtain optical or resist images and cost functions are computed. The cost computation then gives the gradient values that are used in the optimization solver to update variables (e.g., pixel intensities) to obtain the mask image. After several iterations during optimization, a curvilinear mask image is generated, which is further used as guidance map for pattern extraction (e.g., as implemented in Tachyon SMO software). Such a mask image (e.g., the CTM image) may include one or more features (e.g., a feature of a target pattern, SRAFs, SRIFs, etc.) corresponding to the target pattern to be printed on the substrate via the patterning process.

A chip layout is relatively large (e.g., of the order of 10 mm×10 mm) comprising millions or even billions of features. A full-chip layout cannot be processed on a single computer system or processor, as single processor does not have enough processing power to handle patterning process related simulations (e.g., SMO, OPC, etc.) for the full layout. Hence, the full layout is decomposed into a plurality of feature patches and process simulation (e.g., SMO, OPC, etc.) are performed on individual feature patches of the plurality of feature patches. The simulation results (e.g., OPC) are combined to determine the simulation results of the entire layout.

For example, a mask layout may be decomposed into a grid-like pattern, where each rectangular piece of the grid is a patch. In an embodiment, a feature patch (also referred as a patch) refers to a portion of the mask layout containing one or more features on which computation or simulations related to OPC may be performed to improve a performance of the patterning process. The OPC simulation of a target feature results in none or one or more assist features and a modified main feature (e.g., the main feature is a target feature). The OPC related features are represented by polygon shapes. Thus, a feature patch includes a plurality of polygons, where a polygon represent a geometric shape of a feature (e.g., assist feature) of a mask pattern. The term "polygon" is used herein to refer to a feature (e.g., related to OPC or a target feature). In an embodiment, the layout may be of different sizes (e.g., 50 µm×50 µm, 100 µm×100 µm, 110 µm×110 µm, 50 µm×100 µm, 50 µm×120 µm, 10 mm×10 mm, 50 mm×50 mm, 100 mm×100 mm, etc.) which can be decomposed into a plurality of patches (e.g., 10 patches, 20 patches, 50 patches, etc.), where each patch may be the same size or different size (20 µm×20 µm, 20 µm×10 µm, etc.). The present disclosure is not limited to a size of the pattern.

Figure 5A:
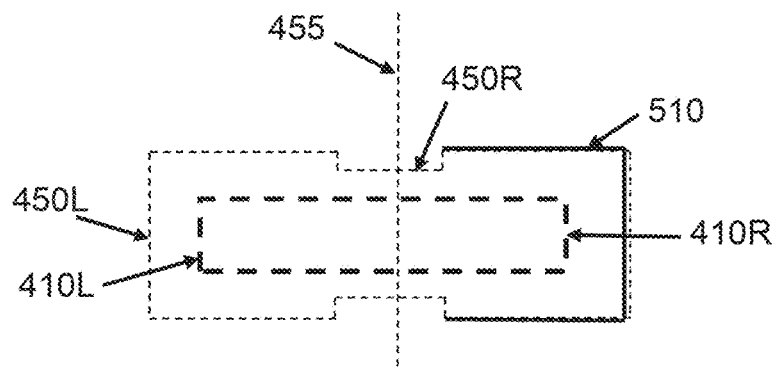
FIG. 5A illustrates example patches comprising a first contour portion and a second contour portion in reference to patterns of FIG. 4A.
Figure 5B:
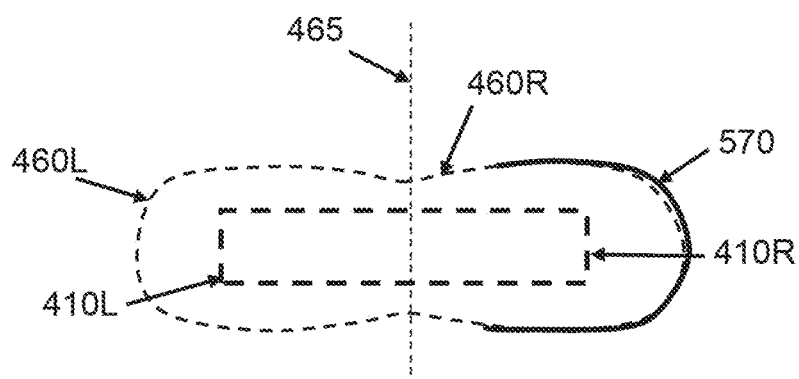
FIG. 5B illustrates example patches comprising a first contour portion and a second contour portion in reference to patterns of FIG. 5B.

In an embodiment, a design layout or the mask layout may be decomposed based on criticality of a feature, sizes of a feature, location of a feature, or other grouping properties. Then, the patches are distributed on different computers (or processors) for parallel computation or simulation. The results of simulations related to each patch is then combined to obtain simulation results for the entire chip layout. However, combining (also referred to as stitching) results of adjacent/neighboring patches may create issues (e.g., miss alignment) at a patch boundary, since the results on either side of the patch boundary may be different. A patch boundary refers to a portion of the layout separating neighboring patches (e.g., a left patch and a right patch). For example, a rectangular feature may be cut or split (e.g., as shown in FIGS. 5A and 5B) into two parts, one rectangular portion contained in a left patch and a second rectangular portion contained in a second patch, and a portion around the split is the patch boundary. A feature or several features may exist entirely in the boundary region as they are within certain influence range from the patch boundary. An influence range of a given patch is a distance from the patch boundary within which a result of neighboring patch affects the polygon shape of a feature of the given patch. For example, for a contact layout, the target features are mostly rectangles with dimension smaller than 100 nm, while the influence range of boundary (or the influence range of a model) may be of the order of micron-meter. So, the simulation results of the target features within the boundary region of a given patch may be considered when generating results for features in the neighboring patches.

At the patch boundary shared by two adjacent/neighboring patches, the polygon of the layout may be cut or split into two parts—a first polygon portion contained in a first patch and a second polygon portion contained in the second patch. During simulating for an aspect (e.g., OPC) of a patterning process using the first patch and the second patch, a first feature portion (e.g., assist feature) of the first patch and a second feature portion (e.g., main and assist features) of the second patch at the boundary of the second patch may differ. Thus, in an embodiment, information (e.g., a polygon portion at the patch boundary) of the first feature portion of the first patch is used during the simulation of the second patch so that the first patch and the second patch can be combined seamlessly. In other words, during the combining or stitching process, the first feature portion and the second feature portion at the boundary region are modified to consistently or smoothly blend at the patch boundary. In an embodiment, feature portions (e.g., OPC) within the patch that are relatively far away from the patch boundary are intact and are not to be modified. In an embodiment, a patch boundary handling process described herein is particularly useful for generating curvilinear mask patterns for a full-chip layout.

In an application, the patch boundary handling method can be integrated with the OPC optimization process (e.g., CTM, CTM+) such that the first feature portion of the first patch is used to generate the second feature portion (e.g., assist feature or a main feature) of the second patch at the patch boundary. In other words, the second feature portion of the second patch at the boundary are forced to follow the first feature portion at the patch boundary.

Figure 3:
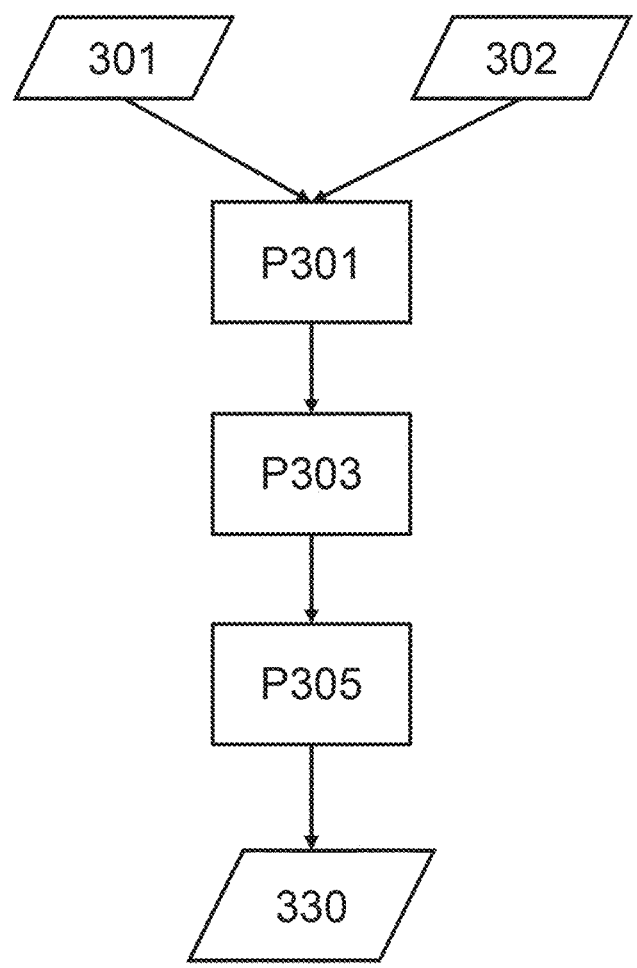
FIG. 3 is a flow chart of a method for generating, based on patches of a design layout/an initial mask pattern, a final mask pattern to be employed in a patterning process according to an embodiment.

FIG. 3 is a flow chart of a method 300 for generating, based on the patches, a mask pattern to be employed in a patterning process. The method 300, in process P301, involves obtaining (i) a first feature patch 301 comprising a first polygon portion of mask pattern (e.g., input pattern or initial mask pattern), and (ii) a second feature patch 302 comprising a second polygon portion of the initial mask pattern. FIGS. 5A and 5B illustrate examples of a first feature patch including a first polygon portion 450L/460L and second feature patch including a second polygon portion 510/570.

In an embodiment, the initial mask pattern and/or the mask pattern is a rectilinear pattern or a curvilinear mask pattern (e.g., output of CTM/CTM+ process). In an embodiment, the initial mask pattern is a design layout comprising a plurality of features to be imaged on a substrate subjected to the patterning process. In an embodiment, the first feature patch and the second patch of the initial mask pattern are adjacent to each other. For example, a left patch is adjacent to a right patch separated by a patch boundary 455/465, as shown in FIGS. 5A and 5B. However, the adjacency is not limited to left-right, but other adjacent patches may also be include, such as a top, bottom or other side patches of a given patch.

The first polygon portion refers to a first portion of a feature or features of the initial mask pattern. The second polygon portion refers to a second portion of the features of the initial mask pattern. The initial mask pattern may be a design layout or an intermediate mask pattern generated during, for example, mask optimization or OPC simulation process. According to an embodiment, the polygon is an aspect corresponding to the feature of the initial mask pattern. The aspect may be an assist feature or a modified main feature obtained during the simulation of an optical proximity correction, source optimization, and/or source-mask optimization process.

Figure 4A:
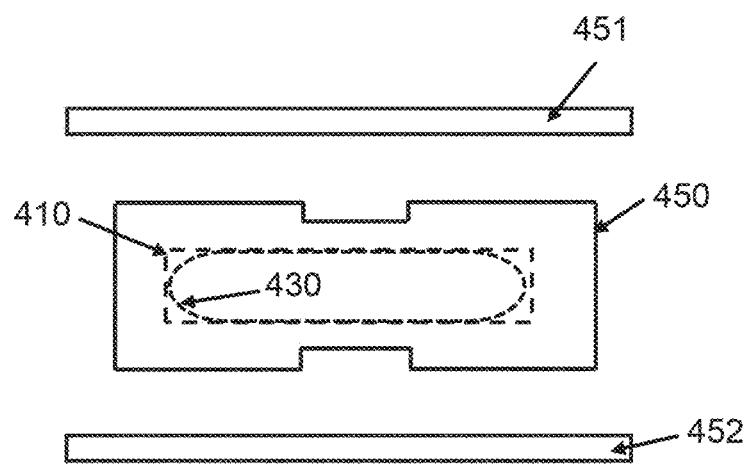
FIGS. 4A and 4B illustrate example rectilinear and curvilinear mask patterns, respectively, according to an embodiment.
Figure 4B:
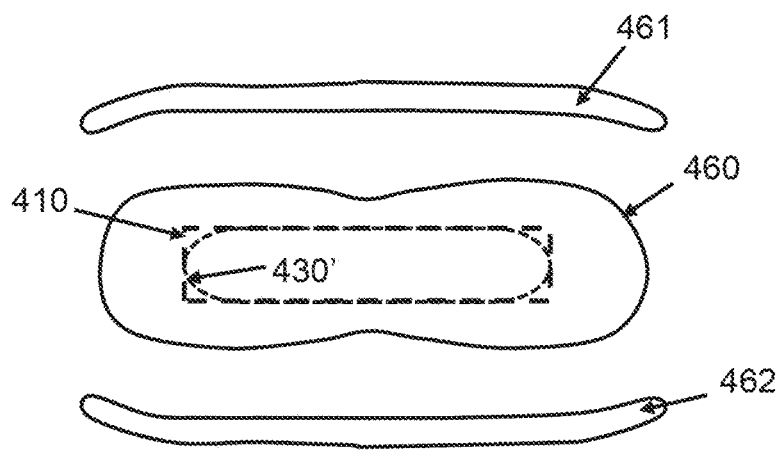

FIGS. 4A and 4B illustrate example rectilinear and curvilinear mask patterns, respectively, obtained from OPC simulation process corresponding to a target feature 410 (also referred as a main pattern). In FIG. 4A, the rectilinear mask pattern comprises a main mask feature 450 (around the main feature 410), first assist features 451 and 452 surrounding the main mask feature 450. When such rectilinear mask pattern comprising features 450, 451 and 452 is used in the patterning process, a printed feature contour 430 is imaged on a substrate. The printed feature 430 is desired to be a close match to the target feature 410.

Similarly, in FIG. 4B, the curvilinear mask pattern comprises a main curvilinear feature 460 (around the main feature 410), first curvilinear assist features 461 and 462 surrounding the main curvilinear feature 460. The curvilinear mask pattern comprising features 460, 461 and 462, when used in the patterning process, prints a printed feature contour 430' on a substrate. The printed pattern 430' is desired to be a close match to the target pattern 410. Typically, the printed features 430' may more closely match the target pattern compared to the printed feature 430 using the rectilinear mask pattern.

However, during the simulation of an aspect (e.g., OPC, mask optimization, etc.) of the patterning process, for example, a mask pattern may be split into patches resulting in different polygons in a first patch and a second patch. For example, as shown in FIG. 5A, a left patch includes a first feature patch comprising a first contour portion 450L (460L in FIG. 5B) and a right patch includes a second feature patch comprising a second contour portion 510 (570 in FIG. 5B). However, a desired contour portion should have a shape of 450R (460R) as shown in FIG. 4A (4B). Hence, in process P303, the portions at the patch boundary 455 (or 465) should be modified or adjusted so that the contour portions join smoothly.

The method, in process P303, involves adjusting the second polygon portion at a patch boundary between the first feature patch and the second feature patch such that a difference (e.g., a cost function below) between the first polygon portion and the second polygon portion at the patch boundary is reduced (in an embodiment, minimized). Alternatively or in addition, the process P303 involves adjusting the first polygon portion at the patch boundary such that the difference between the first polygon portion and the second polygon portion at the patch boundary is reduced (in an embodiment, minimized).

In an embodiment, a cost on mask difference could be used to help the results of neighboring patches to be close. The cost function $f_{boundary}$ can be defined as:

$$f_{boundary} = \sum_i w_i (M_i - M_{i,0})^2$$

In above equation, $w_i$ is a weight at different location (e.g., image pixel), $M_i$ is the pixel value of current (or patch in consideration, e.g., a first patch) at position i, and $M_{i,0}$ the pixel value of the result of neighboring patch (e.g., the second patch) at same location or within the influence range. The adjusting comprises changing pixel values such that the cost function is reduced (in an embodiment, minimized).

In an embodiment, the adjusting of the first portion and/or the second portion involves determining a stitching function configured to seamless join, at the patch boundary, the first polygon portion and the second polygon portion. The stitching function is a mathematical shaping function that generates a curve between the first polygon portion and the second polygon portion based on their respective geometry. The curve is generated such it reduces the difference (e.g., a cost function above) between the first polygon portion and the second polygon portion of the polygon at the patch boundary.

For example, the first polygon portion and the second polygon portion may be two parallel lines having a gap (or difference) therebetween. When such polygon portions are joined directly, there will be a step or an abrupt jump between the polygons. In an embodiment, the stitching function moves the polygon portion(s) near (e.g., within an influence range) to the patch boundary to convert the step into a ramp, or a curve. Thus, the stitching function smooths the differences and connects the results from a left patch to a right patch. For example, the results may comprise two parallel lines that are 0.1 nm apart; the stitching function smooths this 0.1 nm jump.

In an embodiment, a polygon may be represented by a set of points placed along the polygon edge. Then, the stitching function may be configured to move points at the boundaries such that difference between the polygons is reduced and smooth link between the polygons is established. Such smoothing also lends itself for better processing of polygons in other subsequent simulation of patterning process (e.g., optical, resist, etch, etc.) related to the patterning process.

Furthermore, the abrupt change in curvilinear mask pattern at the patch boundary may result in manufacturing difficulties for the mask. Thus, in an embodiment, the stitching function is further configured to include a condition to satisfy a manufacturability check specification related to manufacturability of the mask pattern.

In an embodiment, the process P303 is integrated in a CTM+ boundary handling process, which modifies curvilinear patterns such that a performance metric is improved. In an embodiment, boundary handling is a part of the CTM or CTM+ optimization process used for determining curvilinear mask pattern and OPC associated with the mask pattern. In an embodiment, boundary handling comprises modifying certain features or aspects (e.g., OPC) associated therewith at a particular location (e.g., hot spots) within a patch, while other features or aspects associated therewith are not modified during the CTM process. According to the present disclosure, the boundary handling process is further configured to perform modifications to the features at the patch boundary.

Thus, in the present disclosure, the boundary handling is limited or localized to a region around the patch boundary. The boundary handling is based on a formulation of a cost function that limits the comparison between the baseline image (e.g., left patch in FIGS. 5A and 5B) and the current image (e.g., a right patch in FIGS. 5A and 5B) to the patch boundary region only. In other words, during optimization process, features (e.g., hot spots) away from the patch boundary or features close to the patch boundary that are not cut or split will not be modified. Thus, forcing results at the boundary of right patch to match the results of left patch. In an embodiment, the boundary handling includes the stitching function and a corresponding cost term to generate a smooth mask polygon profile across the patch boundary. Such stitching also involves MRC to be satisfied.

Figure 6:
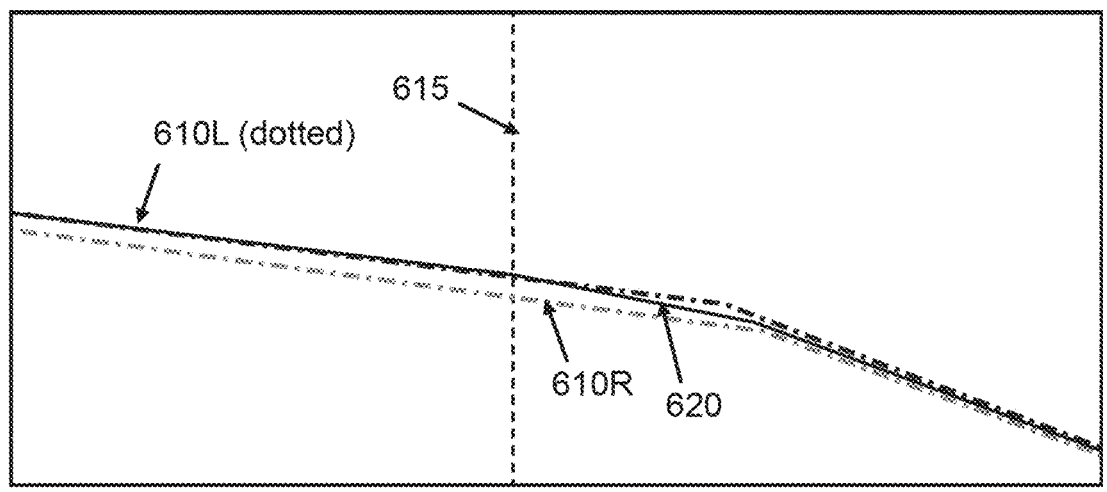
FIG. 6 illustrates an example stitching curve 620 generated by the stitching function.

FIG. 6 illustrates an example stitching curve 620 generated by the stitching function. In FIG. 6, a reference curvilinear polygon is split by a patch boundary 615 into (i) a left polygon portion 610L (dotted), which is generated by simulation of a patterning process (e.g., OPC) the features of the left patch, and (ii) a right polygon portion 610R, which is generated by simulation of the patterning process (e.g., OPC) of the right patch with information from the left patch, particularly, the left polygon portion 610L. When the individual patches are processed, the left patch and right patch includes polygon portions having minor, but substantial difference with respect to the each other. The stitching function generates the curve 620 to reduce the difference between the polygon portions 610L and 610R. Further, the right patch result is adjusted with the curve 620. In an embodiment, a portion of the left patch may also be adjusted at the patch boundary region. Thus, when the left polygon portion 610L, and the right polygon portion 610R is combined (e.g., in process P305), a modified feature 620 as the mask pattern thereof is obtained. In an embodiment, the stitching function may be applied at exactly the patch boundary, or at a distance from the patch boundary.

The method, in process P305, involves determining the mask pattern to include a combination of the first polygon portion and the adjusted second polygon portion of the features at the patch boundary. Alternatively or in addition, the process P305 involves determining the mask pattern to include a combination of the adjusted first polygon portion and the second polygon portion of the features at the patch boundary.

In an embodiment, the method 300 may be further based on prioritized patches, where the initial mask pattern comprises a plurality of patches arranged in a sequence, each patch having a priority value (e.g., from 0 to n, where 0 is highest priority and n is the lowest priority) within the sequence. Further, the combining of the results of the neighboring patches is based on the priority values of each patch.

In an embodiment, a CTM+ process generates a curvilinear mask pattern using a level-set method. In the level-set method, a contour (the curvilinear mask pattern in CTM+ process) is traced from the level set at which it equates to a threshold value. The level set function may be represented as a level-set image and the threshold value may represent a plane that intersects the level set image, where contour tracing is done at the intersection therebetween. Once the contour is obtained, the original level-set image that was used may not be inverse mapped. In other words, the original level-set image that was used may not be inverse mapped, as the contour does not have enough information to determine the original level-set function.

Because contours characterize features in a curvilinear mask pattern herein, a mathematical description, e.g., based on level-set function, of such contours can be defined. An example level-set function $Ø(x,y)$ representing a curvilinear mask pattern is a function with the property as follows: (1) $Ø(x,y)=C$ everywhere along the contour, C is a threshold value; (2) $Ø(x,y)>C$ "inside" a region (for example, those regions corresponding to the chrome portions of the mask); and (3) $Ø(x,y)<C$, or is "outside" a region (for example, those regions corresponding to the clear quartz portions of the mask). In an embodiment, the inequality signs in (2) and (3) could be inverted, depending on the choices of reference.

The contours are defined by the "level-set", i.e. sets of points in the (x,y) plane, at which $Ø(x,y)=C$. In an embodiment, the level-set function may be represented as a pixelated image, where some pixels have a pixel value corresponding to the contour. Thus, the threshold value corresponds to a pixel value defining the contour. In an embodiment, the optimization involves adjusting such pixel values at the patch boundary based on a cost function that reduces the difference in polygon portions as described above.

In an aspect of the present invention to find a level-set function $Ø(x,y)$ for given a target pattern, such that the level-set $Ø(x,y)=C$ defines a set of contours or polygons, which, when interpreted as the mask patterns of the features at boundaries, producing a wafer pattern with little distortions and artifacts compared to the target patterns. The wafer pattern results from a photolithography process using the mask pattern obtained herein. The extent to which the set of contours defined by a level-set function Ø(x,y) is optimal is calculated based on a performance metric such as a differential of an edge placement error between a predicted wafer pattern and a target pattern is reduced.

Given a curvilinear mask polygon p (or a contour), we want to reconstruct, for example, an image Ø which is approximately the level set function/image of the polygon p, which means the polygon corresponding to image Ø is very close to original polygon, p'≈p. Here C is the threshold of contour tracing.

$$p' = \{(x_1, x_2, \ldots, x_N) | Ø(x_1, x_2, \ldots, x_N) \equiv C\}$$

Figure 7A:
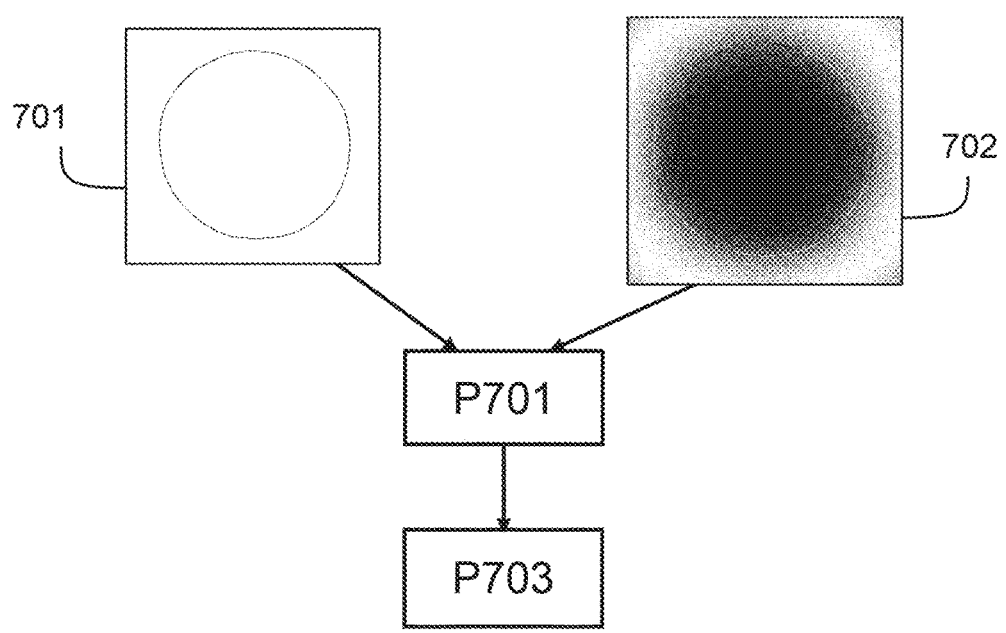
FIGS. 7A and 7B is flowchart of method for reconstructing a level-set function of a curvilinear mask pattern.

In an embodiment, with reference to FIG. 7A, an example method 700 of reconstructing a level-set function of a contour of a curvilinear mask pattern is provided. In other words, an inverse mapping (loosely speaking) from the contour to generate an input level-set image. The method 700 can be used to generate an image to initialize the CTM+ optimization in a region nearby the patch boundary.

The method, in process P701, involves obtaining (i) the curvilinear mask pattern 701 and a threshold value C, (ii) an initial image 702, for example the mask image rendered from the curvilinear mask pattern 701. In an embodiment, the mask image 702 is a pixelated image comprising a plurality of pixels, each pixel having a pixel value representative of a feature of a mask pattern. The image 702 may be a rendered mask image of the curvilinear mask pattern 701.

The method, in process P703, involves generating, via a processor (e.g., processor 104), the level-set function by iteratively modifying the image pixels such that a difference between interpolated values on each point of the curvilinear mask pattern and the threshold value is reduced. This could be represented by a cost function as given below:

$$f = w \sum_i w_i (Ø(x_i) - C)^2$$

In an embodiment, the generating of the level-set function involves identifying a set of locations along the curvilinear mask pattern, determining level-set function values using pixel values of the initial image interpolated at the set of locations, calculating the difference between the values and the threshold value C, and modifying one or more pixel values of pixels of the image such that the difference (e.g., the cost function f above) is reduced.

Figure 7B:
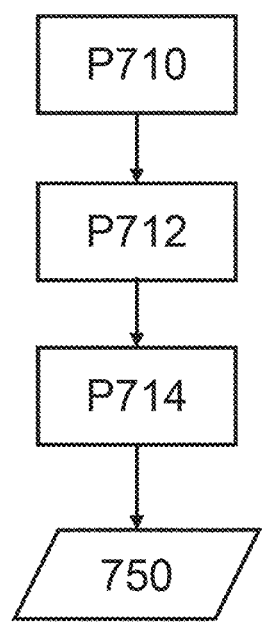

In an embodiment, the method 700 may be further extended in the boundary handling of curvilinear mask, as shown in FIG. 7B. In process P710, for a current patch, a final result of a neighboring patch is obtained, as priority polygon in the boundary region. Further, the process P712 involves computing a level-set image of the priority polygon, as in process P703. Process P714 involves determining, based on the reconstructed level-set image, the image values of the boundary region. And further optical proximity correction 750 (e.g., using CTM/CTM+) optimizes the mask of the entire current patch, including the boundary region.

Figure 8:
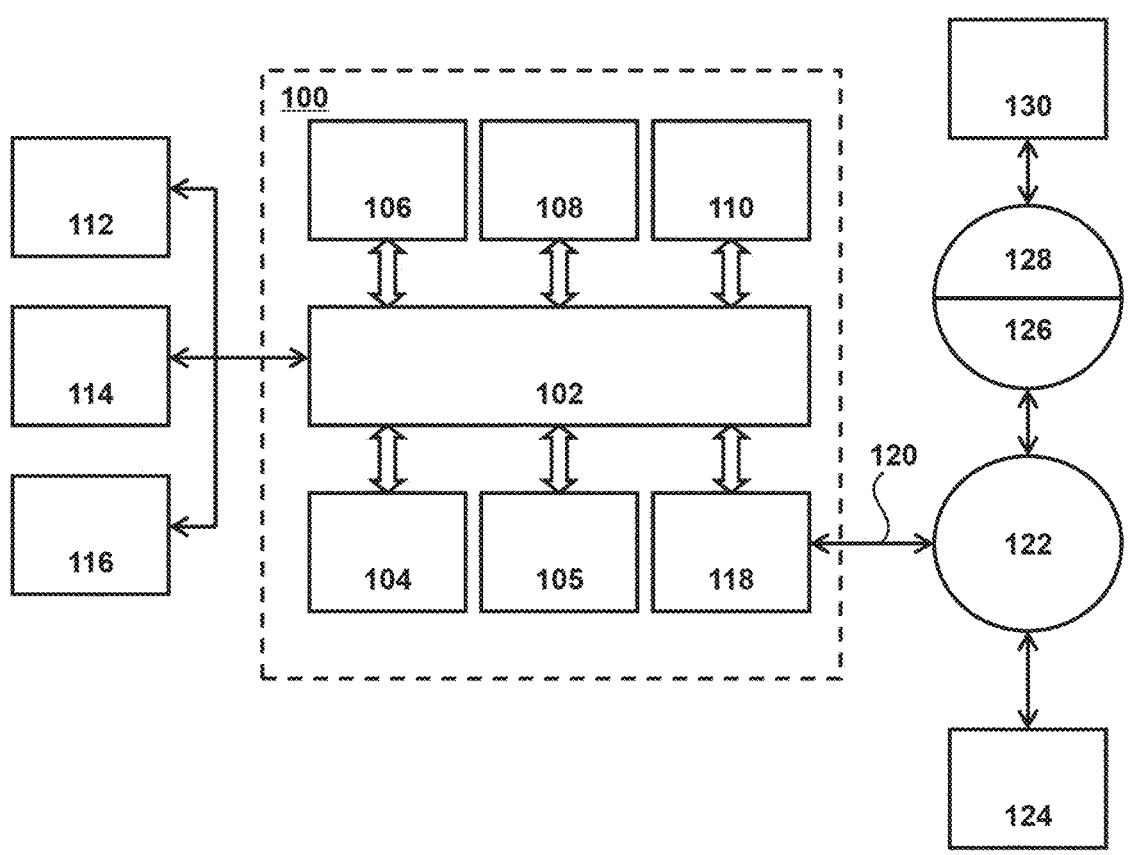
FIG. 8 is a block diagram of an example computer system, according to an embodiment.

FIG. 8 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 9:
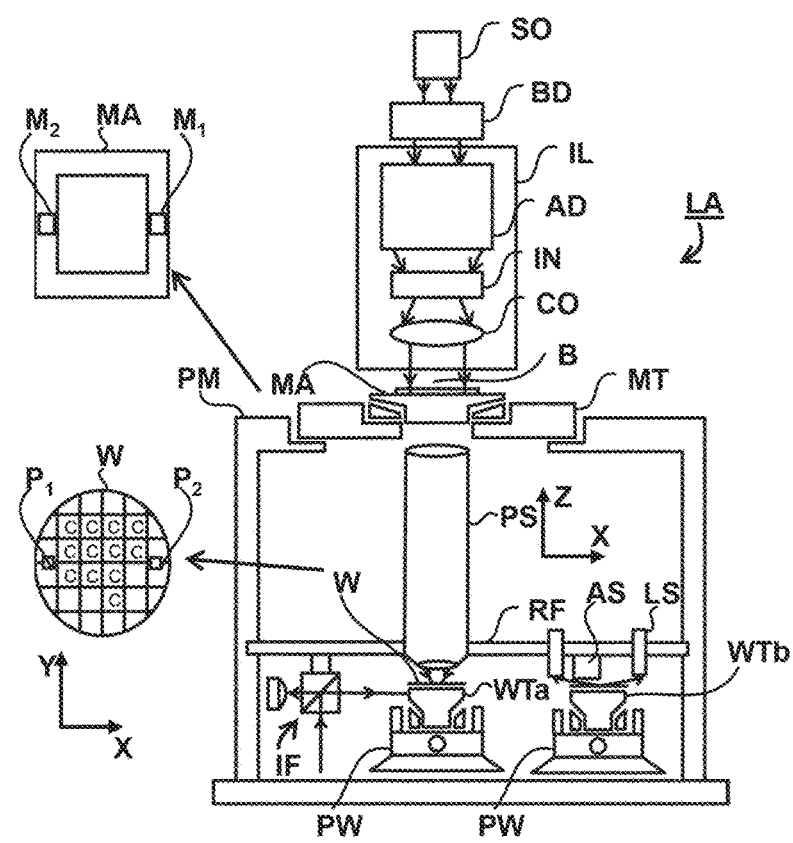
FIG. 9 is a schematic diagram of a lithographic projection apparatus, according to an embodiment.

FIG. 9 schematically depicts an exemplary lithographic projection apparatus in conjunction with the techniques described herein can be utilized. The apparatus comprises:

an illumination system IL, to condition a beam B of radiation. In this particular case, the illumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist-coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 9 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 9. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 10:
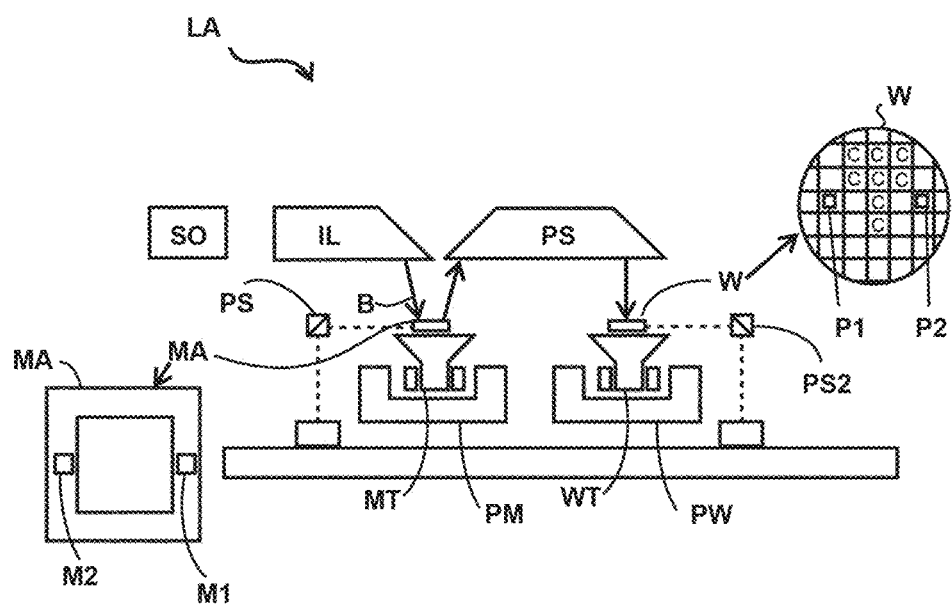
FIG. 10 is a schematic diagram of another lithographic projection apparatus, according to an embodiment.

FIG. 10 schematically depicts another exemplary lithographic projection apparatus 1000 in conjunction with the techniques described herein can be utilized. The lithographic projection apparatus 1000 comprises:
- a source collector module SO
- an illumination system (illuminator) IL configured to condition a radiation beam B (e.g. EUV radiation).
- a support structure (e.g. a patterning device table) MT constructed to support a patterning device (e.g. a mask or a reticle) MA and connected to a first positioner PM configured to accurately position the patterning device;
- a substrate table (e.g. a wafer table) WT constructed to hold a substrate (e.g. a resist coated wafer) W and connected to a second positioner PW configured to accurately position the substrate; and
- a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 10, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 10, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as faceted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:
1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.
2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.
3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 11:
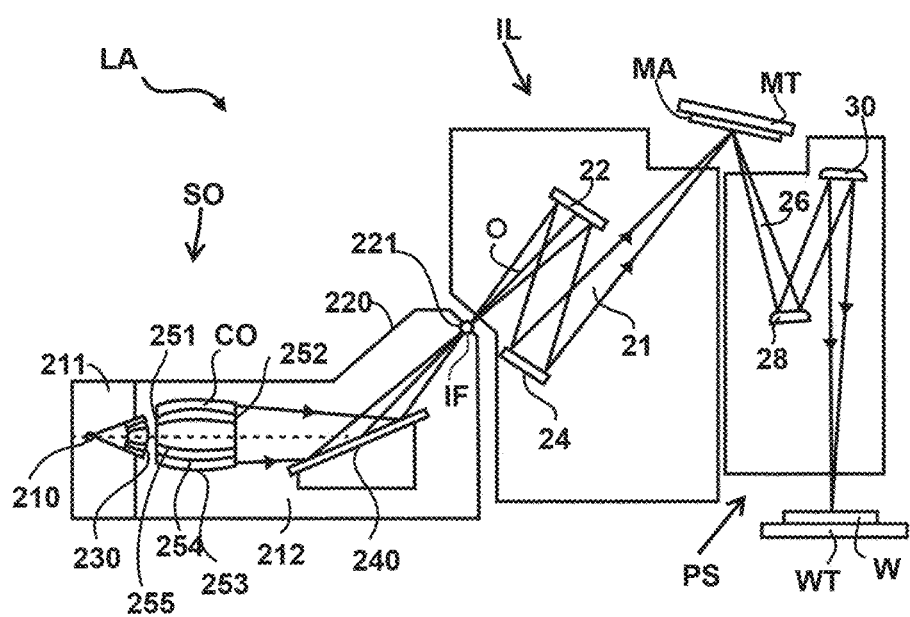
FIG. 11 is a more detailed view of the apparatus in FIG. 9, according to an embodiment.

FIG. 11 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 11.

Collector optic CO, as illustrated in FIG. 11, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 12:
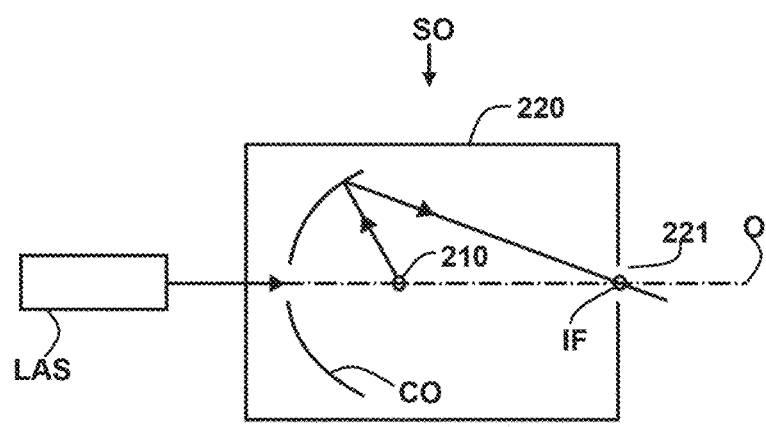
FIG. 12 is a more detailed view of the source collector module SO of the apparatus of FIG. 10 and FIG. 11, according to an embodiment.

Alternatively, the source collector module SO may be part of an LPP radiation system as shown in FIG. 12. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method of determining a mask pattern to be employed in a patterning process, the method comprising:
   obtaining (i) a first feature patch comprising a first polygon portion of an initial mask pattern, and (ii) a second feature patch comprising a second polygon portion of the initial mask pattern;
   adjusting the second polygon portion at a patch boundary between the first feature patch and the second feature patch such that a difference between the first polygon portion and the second polygon portion at the patch boundary is reduced; and
   combining the first polygon portion and the adjusted second polygon portion at the patch boundary to form the mask pattern.
2. The method of clause 1, wherein the initial mask pattern is a design layout comprising a plurality of features to be imaged on a substrate subjected to the patterning process.
3. The method of any of clauses 1-2, wherein the first polygon portion and the second polygon portion are an aspect corresponding to the feature of the initial mask pattern.
4. The method of clause 3, wherein the aspect is an assist feature corresponding to the target feature, the assist feature obtained via an optical proximity correction, source optimization, and/or source-mask optimization.
5. The method of any of clauses 1-4, further comprising:
   adjusting the first polygon portion at the patch boundary between the first feature patch and the second feature patch such that the difference between the first polygon portion and the second polygon portion at the patch boundary is reduced; and
   determining the mask pattern to include a combination of the adjusted first polygon portion and the second polygon portion at the patch boundary.
6. The method of any of clauses 1-5, wherein the adjusting of the first polygon portion and/or the second polygon portion comprises:
   determining a stitching function configured to seamless join, at the patch boundary, the first polygon portion and the second polygon portion, wherein the stitching function is a mathematical shaping function that reduces the difference between the first polygon portion and the second polygon portion at the patch boundary
7. The method of clause 6, wherein the difference between the first polygon portion and the second polygon portion is a step or a jump.
8. The method of clause 7, wherein the stitching function moves the polygon portions of the polygon at the patch boundary to convert the step into a ramp, or a curve.
9. The method of any of clauses 6-8, wherein the stitching function is further configured to include a condition to satisfy a manufacturability check specification related to manufacturability of the mask pattern.
10. The method of any of clauses 1-9, wherein the initial mask pattern comprises a plurality of patches arranged in a sequence, each patch having a priority value within the sequence.

11. The method of any of clauses 1-10, wherein the determining the mask pattern further comprises an iterative process, an iteration comprising:
selecting a patch having a relatively lower priority value within the sequence of the plurality of the patches;
adjusting a polygon portion within the selected patch and/or another polygon portion within an adjacent patch of the selected patch such that the difference between the polygon portions is reduced; and
generating the mask pattern by combining one or more patches having the same priorities with corresponding adjacent one or more patches of the plurality of patches.

12. The method of any of clauses 1-11, wherein the difference is minimized.

13. The method of any of clauses 1-12, wherein the first feature patch and the second feature patch are adjacent to each other 14. The method of any of clauses 1-13, wherein the initial mask pattern and/or the mask pattern is a curvilinear mask pattern.

15. A method of reconstructing a level-set function of a curvilinear mask pattern, the method comprising:
obtaining (i) the curvilinear mask pattern and a corresponding threshold value, (ii) an initial image rendered from the curvilinear mask pattern; and
generating, via a processor, the level-set function of the curvilinear mask pattern by iteratively modifying the initial image such that a difference between an interpolated value of the curvilinear mask pattern and the threshold value is reduced.

16. The method of clause 15, wherein the mask image is a pixelated image comprising a plurality of pixels, each pixel having a pixel value representative of a feature of a mask pattern.

17. The method of any of clauses 15-16, wherein the generating of the level-set function comprises:
identifying a set of locations along the curvilinear mask pattern;
determining output values of the level-set function based on pixel values of pixels corresponding to the set of locations within the mask image, wherein the level-set function is a mathematical function representing the curvilinear mask pattern of the mask image;
determining a total difference between the output values of the level set function and the threshold value; and
modifying one or more pixel values of pixels of the mask image, the total difference is reduced.

18. The method of any of clauses 15-17, wherein the mask image is a rendered mask image of the curvilinear mask pattern.

19. The method of any of clauses 15-18, further comprising:
obtaining, for a current patch, a polygon of a neighboring patch in the boundary region, wherein the current patch and the neighboring patch are portions of the curvilinear mask pattern;
reconstructing the level-set function of the polygon of the neighboring patch;
determining, based on the reconstructed level-set function, function values in the boundary region of the current patch; and
adjusting, via an optical proximity correction process employing the function values, the curvilinear mask pattern of the entire current patch.

20. The method of clause 19, wherein obtaining the plurality of patches comprises:
decomposing the curvilinear mask pattern into a plurality of patches, wherein the curvilinear mask pattern is split at a patch boundary between adjacent patches.

21. A non-transitory computer program product comprising machine-readable instructions for causing a processor to cause performance of the method of any of clauses 1-20.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

The invention claimed is:

1. A method of determining a mask pattern to be employed in a patterning process, the method comprising:
obtaining (i) a first feature patch comprising a first portion associated with an initial mask pattern image, and (ii) a second feature patch comprising a second portion associated with the initial mask pattern image;
adjusting, by a hardware computer system, the second portion at a patch boundary between the first feature patch and the second feature patch such that a difference between the first portion and the second portion at the patch boundary is reduced; and
combining the first portion and the adjusted second portion at the patch boundary to form the mask pattern.

2. The method of claim 1, further comprising:
adjusting the first portion at the patch boundary between the first feature patch and the second feature patch such that the difference between the first portion and the second portion at the patch boundary is reduced; and
determining the mask pattern to include a combination of the adjusted first portion and the second portion at the patch boundary.

3. The method of claim 1, wherein the adjusting of the first portion and/or the second portion comprises determining a stitching function configured to seamlessly join, at the patch boundary, the first portion and the second portion, wherein the stitching function is a mathematical shaping function that reduces the difference between the first portion and the second portion at the patch boundary.

4. The method of claim 1, wherein the initial mask pattern comprises a plurality of patches arranged in a sequence, each patch having a priority value within the sequence.

5. The method of claim 1, comprising an iterative process, an iteration thereof comprising:

selecting a patch within a sequence of a plurality of patches comprising the first and second feature patches, each patch having a priority value;

adjusting a portion within the selected patch and/or another portion within an adjacent patch of the selected patch such that the difference between the portions is reduced; and generating the mask pattern by combining one or more patches having same priorities with corresponding adjacent one or more patches of the plurality of patches.

6. The method of claim 1, wherein the initial mask pattern and/or the mask pattern is a curvilinear mask pattern.

7. A non-transitory computer program product comprising machine-readable instructions therein, the instructions, when executed by one or more processors, are configured to cause the one or more processors to at least:

obtain (i) a first feature patch comprising a first portion associated with an initial mask pattern image, and (ii) a second feature patch comprising a second portion associated with the initial mask pattern image;

adjust the second portion at a patch boundary between the first feature patch and the second feature patch such that a difference between the first portion and the second portion at the patch boundary is reduced; and combine the first portion and the adjusted second portion at the patch boundary to form a mask pattern to be employed in a patterning process.

8. The non-transitory computer program product of claim 7, wherein the instructions are further configured to cause the one or more processors to:

adjust the first portion at the patch boundary between the first feature patch and the second feature patch such that the difference between the first portion and the second portion at the patch boundary is reduced; and determine the mask pattern to include a combination of the adjusted first portion and the second portion at the patch boundary.

9. The non-transitory computer program product of claim 7, wherein the instructions configured to cause the one or more processors to adjust of the first portion and/or the second portion are further configured to cause the one or more processors to determine a stitching function configured to seamlessly join, at the patch boundary, the first portion and the second portion, wherein the stitching function is a mathematical shaping function that reduces the difference between the first portion and the second portion at the patch boundary.

10. The non-transitory computer program product of claim 7, wherein the initial mask pattern comprises a plurality of patches arranged in a sequence, each patch having a priority value within the sequence.

11. The non-transitory computer program product of claim 7, wherein the instructions are further configured to cause the one or more processors to perform an iterative process, an iteration thereof comprising:

selection of a patch within a sequence of a plurality of patches comprising the first and second feature patches, each patch having a priority value;

adjustment of a portion within the selected patch and/or another portion within an adjacent patch of the selected patch such that the difference between the portions is reduced; and generation of the mask pattern by combination of one or more patches having same priorities with corresponding adjacent one or more patches of the plurality of patches.

12. The non-transitory computer program product of claim 7, wherein the initial mask pattern and/or the mask pattern is a curvilinear mask pattern.

* * * * *